United States Patent [19]

Ingram, Jr. et al.

[11] Patent Number: 5,324,113
[45] Date of Patent: Jun. 28, 1994

[54] PROCESS FOR MULTISPECTRAL/MULTILOOK ATMOSPHERIC ESTIMATION

[75] Inventors: Paul M. Ingram, Jr., Mesquite; James R. Johnson, Plano; Fenton L. Givens, Dallas, all of Tex.

[73] Assignee: E-Systems, Inc., Dallas, Tex.

[21] Appl. No.: 988,791

[22] Filed: Dec. 10, 1992

[51] Int. Cl.$^5$ .......................... G01J 5/02; G01W 1/10
[52] U.S. Cl. ..................... 374/124; 374/109; 364/420
[58] Field of Search ............... 250/330; 364/420, 557; 374/109, 124, 129, 134, 137

[56] References Cited

U.S. PATENT DOCUMENTS

| | | | |
|---|---|---|---|
| 3,702,735 | 11/1972 | Potter, Jr. | 250/330 |
| 4,420,265 | 12/1983 | Everest et al. | 374/124 |
| 4,661,907 | 4/1987 | Arnone et al. | 364/420 |
| 5,160,842 | 11/1992 | Johnson | 250/330 |

FOREIGN PATENT DOCUMENTS 1443011 12/1988 U.S.S.R. ............... 364/420

OTHER PUBLICATIONS

"Surface reflectance measurements in the UV from an airborne platform, Part 1", D. D. Doda and A. E. S. Green, *Applied Optics*, vol. 19, No. 13, Jul. 1, 1980.

Primary Examiner—William A. Cuchlinski, Jr.
Assistant Examiner—G. Bradley Bennett
Attorney, Agent, or Firm—Harold E. Meier

[57] ABSTRACT

A method of estimating both atmospheric conditions and surface temperatures of an object from either a single set of multispectral images or multiple simultaneously-acquired single-band images of the object. Estimates of atmospheric conditions are generated by determining and radiometrically correcting radiance values measured from the image of the object. Expected radiance values are then determined and compared with the measured radiance values. The best fit of the radiance values measured from the image of the object to the expected radiance values corresponds to the best estimate of the atmospheric conditions associated with the object. The present method estimates atmospheric conditions for the object regardless of the availability of atmospheric conditions associated with the image.

18 Claims, 3 Drawing Sheets

PROCESS FOR MULTISPECTRAL/MULTILOOK ATMOSPHERIC ESTIMATION

TECHNICAL FIELD

The present invention relates to methods for estimating atmospheric conditions and surface temperatures of terrestrial objects, and more specifically to a method for estimating both atmospheric conditions and surface temperatures of terrestrial bodies from either a single set of multispectral images or multiple simultaneously-acquired single-band images of the body.

BACKGROUND OF THE INVENTION

Estimates of atmospheric conditions and surface temperatures of terrestrial objects are important both for practical applications associated with space exploration, space commercialization and military operations as well as theoretical uses, including education and research within the fields of astronomy, astrophysics, etc. Such estimates are typically derived in part from remote measures, or images, of radiance emitted from the object. Information derived from the images is subsequently manipulated vi mathematical modeling to correct any altering effect of the atmosphere, pollution, etc., on the images as they are transmitted from the object to the observer or sensor. Existing mathematical functions ar available to describe the relationship between the radiance emitted from an object and the radiance sensed from the object.

There exists a number of prior art methods utilizing imaging to estimate surface temperatures of distant bodies. Traditionally, the estimation of information about a distant body has been accomplished using methods which combine imaging of the object to be studied with atmospheric conditions existing at the time and place of the imaging. Typically, these prior art methods utilize methods of radiometric modeling such as low-resolution atmospheric transmission (Lowtran) moderate-resolution atmospheric transmission (Modtran) or high-resolution transmission (Hitran) to describe the relationship between the radiance sensed and the radiance emitted.

Unfortunately, these methods require that the atmospheric conditions measured at the time and location of imaging be known quantities. Moreover, the use of such atmospheric condition information often introduces margins of error to the estimations due to the fact that the atmospheric conditions are estimated from values measured at remote distances and times from the time and place of imaging.

Other prior art methods employ specialized transmission models such as the Sea Surface Temperature (SST) Algorithm. As the name suggest, however, this method is only applicable to particular cases where the surface to be studied is imaged through maritime atmospheric conditions. Additionally, this method suffers from the same known atmospheric condition quantity limitations associated with the methods discussed above.

Thus a need has arisen for a method of estimating both atmospheric conditions and surface temperatures of terrestrial bodies from either a single set of multispectral images or multiple simultaneously-acquired single-band images of the body independent of the availability of atmospheric information at the time and location of the imaging.

SUMMARY OF THE INVENTION

The present invention overcomes the foregoing and other problems associated with the prior art by supplying a method of atmospheric calibration for estimating both atmospheric conditions and surface temperatures from either a single set of multispectral images or multiple simultaneously-acquired single-band images independent of the availability of atmospheric information.

Unlike the prior art methods previously discussed, the present invention does not require known atmospheric quantities at the time and location of the imaging to accurately estimate the atmospheric conditions and/or surface temperature of a distant object. In cases where such atmospheric information is known and available, the invention detects and corrects errors in the atmospheric condition information utilizing information contained in the images. The correction of such errors provides more accurate determinations of the surface temperature.

In those cases where atmospheric condition information is unknown, the present invention accurately estimates the atmospheric conditions directly from information derived from the image. Estimation of the atmospheric parameters by this method is superior to the prior art method use of remotely measured atmospheric parameters since any errors inherent in the estimations are corrected by the method of the present invention. Once the atmospheric conditions are estimated, a best estimate of the surface temperature is determined using the present invention method.

The method of the present invention accomplishes this by determining the best fit of the estimated atmospheric conditions to the radiance values measured from the images. This best fit process involves two basic constructions: (1) the Atmospheric Parameter Space; and (2) Radiance Error Function.

The Atmospheric Parameter Space provides the domain for the fitting process used by the invention. A restricted set of possible atmospheric conditions is determined and coordinatized as multi-dimensional space. Although this discussion will focus on two-dimensional values for ease of explanation, the present invention is extendable to higher dimensions. Next, radiance values of the image are measured from the image. When these values have been determined, they are compared with the expected radiance values corresponding to the Atmospheric Parameter Space.

A Radiance Error Function is derived by measuring how well the set of expected radiance values derived from the Atmospheric Parameter Space, represented by a point in the domain, fit the radiance values measured from the images. By determining the point in the Atmospheric Parameter Space which minimizes the Radiance Error Function, the present method determines the atmospheric conditions existing at the time and location of the imaging.

If atmospheric condition information exists for the images being used, such information is used to define the Atmospheric Parameter Space. Any errors in this known atmospheric condition information due to estimations made from measurements taken at remote times and/or locations from the time and place of imaging are subsequently corrected by determining the best fit of the radiance values from the image to the expected radiance values derived from the domain defined by the Atmospheric Parameter Space.

If atmospheric condition information associated with the image is unavailable, estimates are made to define the Atmospheric Parameter Space. Determining the best fit of the radiance values from the image to the expected radiance values pinpoints the atmospheric conditions existing at the time and place of the imaging, correcting any inaccuracies estimated when defining the Atmospheric Parameter Space. The temperature corresponding to the best fit of the radiance values from the image to the expected radiance values is the best estimate of the surface temperature of the object of interest.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
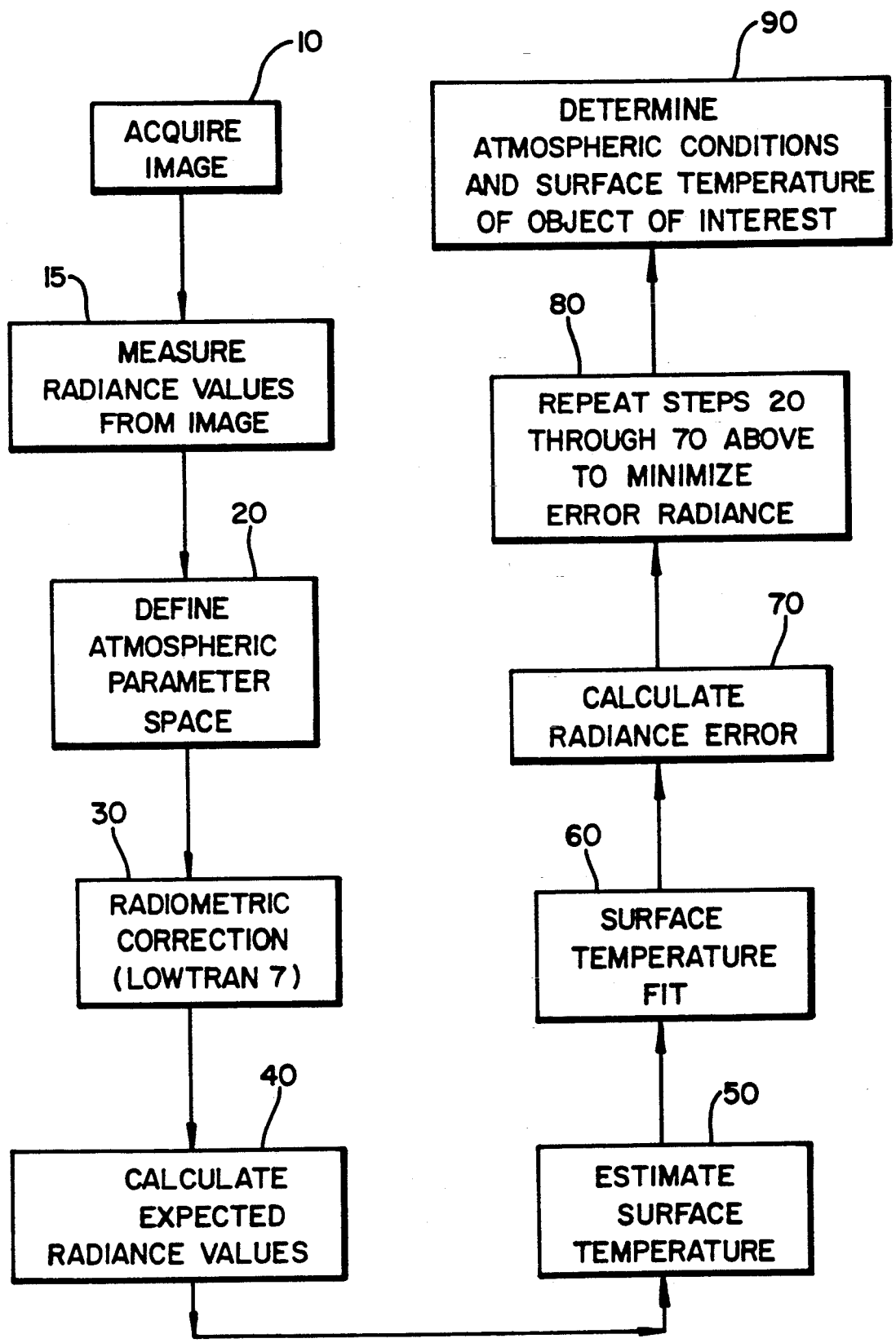
FIG. 1 is a flow chart illustrating the steps of the atmospheric conditions and surface temperature estimation method of the present invention.

Referring now to FIG. 1, estimation of atmospheric conditions, including surface temperature, for a distant object, such as a terrestrial body, is accomplished using the method of the present invention by fitting radiance values measured from an image of the distant body of interest to expected radiance values derived from atmospheric condition data either gathered from the image itself or measured simultaneously with the creation of the image. This "fit" of measured radiance values with expected radiance values is accomplished using two constructions: Atmospheric Parameter Space and Radiance Error Function. Once the fit is determine, an error function, describing how well the information fits, is determined. Minimizing this error function gives the best fit of the information, directly corresponding to the atmospheric conditions and surface temperature of the body or surface of interest.

First, an infrared image of the body of interest is acquired in step 10. This image is generated through a number of existing methods known in the art, such as the use of a thermal infrared multispectral sensor or a singleband thermal infrared sensor. Images from NASA's LANDSAT satellite and ones created by the National Oceanic and Atmospheric Administration (NOAA) via an advanced very high resolution radiometer (AVHRR) are available for use with the estimation method of the present invention. Although a single infrared image is described herein, it should be noted that an alternate embodiment of the present method utilizes a single set of multispectral images or multiple simultaneously-acquired single-band images.

Once an image has been acquired, radiance values are measured in step 15 from the image and used in the estimation of atmospheric conditions including surface temperature. The radiance values are measured by any number of techniques well known in the art.

In step 20 of the method, the Atmospheric Parameter Space is defined. This is a restricted set of possible atmospheric condition parameters associated with the image of the distant body, represented by a multi-dimensional function.

The Atmospheric Parameter Space is constructed either with known values for the atmospheric conditions of interest existing at the time and location of the image acquisition or by estimating such conditions. Later steps in the process are run to correct errors, if any, occurring in these measurements or estimates. Such errors are typically introduced by: (1) estimating the conditions in the case where no known values exist in connection with the image; or (2) measuring the conditions at a remote time and/or location from the time and location associated with acquisition of the image.

Once this preliminary atmospheric condition information is obtained, through measurement or estimate, the information is subjected to a method of radiometric modeling by means of Lowtran7 in step 30. Lowtran7 and other radiometric modeling methods are well known in the art. Although the Lowtran7 method of radiometric modeling is described, it should be noted that other methods of radiometric modeling such as moderate-resolution atmospheric transmission (Modtran) modeling and hiresolution atmospheric transmission (Hitran) modeling can be utilized, if desired.

Typically, Lowtran7 modeling requires known measurements for a number of weather and atmospheric conditions so that profiles of these parameters are utilized, e.g., atmospheric temperature profile, water vapor profile, aerosol density profile and atmospheric pressure profile. These parameters are modeled as piecewise linear functions of altitude, with the number of altitude levels varying up to thirty-three (33).

For the estimation method of the present invention, values for these parameters are needed only for the lower levels of the atmosphere (e.g., below the tropopause). This is due to the fact that values of these parameters at higher altitudes vary predictably both seasonally and regionally. Therefore, values for parameters at these higher levels of the atmosphere are set to known seasonal and regional values. Only the levels closest to the earth's surface have widely varying values for these parameters.

The foregoing observations allow for considerable simplification of the definition of the Atmospheric Parameter Space. For ease of description, a two dimensional characterization of the Atmospheric Parameter Space will be described. However, it should be noted that the process is extendable to include three or more dimensions.

For example, atmospheric temperature, t, and water vapor density, w, are selected as the two independent variables utilized for the Atmospheric Parameter Space in this description. The two independent variables will characterize the atmospheric temperature and water vapor density profiles, and will be the quantities to be identified in the best fit process described later. The atmospheric temperature and water vapor density were chosen because these parameters typically have a dominant influence on the radiometric environment and vary significantly over short time (i.e., hours) and spatial (i.e., miles) scales.

Having defined the independent variables t and w for atmospheric temperature and water vapor density, respectively, measurements for these variable at available levels of the atmosphere are made. Having defined t and w and measured values for the same, profiles of the variables are extended to predict values at other atmospheric levels, for example, the tropopause level of the atmosphere.

Figure 2:
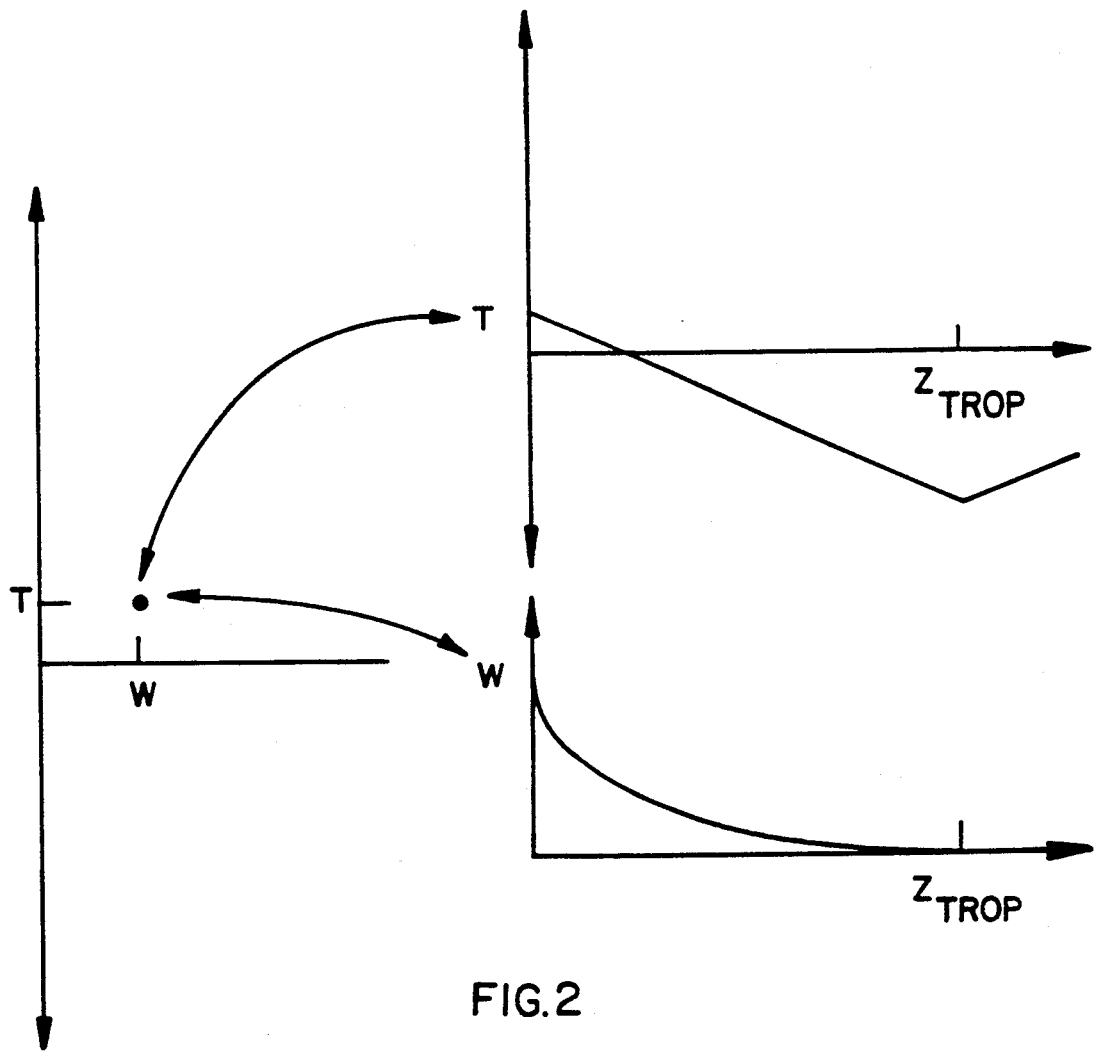
FIG. 2 is a graphical representation of the atmospheric condition parameter profiles used in the steps of the present invention method.

Referring to FIG. 2, a graphical representation of extended profiles for the two independent variables t and w is shown. The analytical formulation of the profiles for these variables proceeds as follows. First, assume that the atmosphere is to be modeled at M levels, and let the altitudes of the atmosphere be defined by $z(i)$, where i equals 1 through M (i.e., $z(i)$, $i = 1, \ldots, M$). Now let the index of the tropopause level of the atmosphere be $i_{trop}$, and let the temperature and water vapor density at the tropopause be $T(i_{trop})$ and $W(i_{trop})$, respectively.

If the atmospheric temperature at ground level is unknown and represented by t, then the atmospheric temperature profile is given by:

$$T(i) = t + [T(i_{trop}) - t]\left[\frac{z(i) - z(1)}{z(i_{trop}) - z(1)}\right]$$

where $i = 1, \ldots, i_{trop}$.

If the value for the ground temperature is known, and the lapse rate (i.e., the rate at which the temperature varies over the levels of the atmosphere) is unknown and represented by t, then the atmospheric temperature profile is given by:

$$T(i) = T(1) + t(z(i) - z(1)) + [T(i_{trop}) - T(1) - t[z(i_{trop}) - z(1)]]\left[\frac{z(i) - z(1)}{z(i_{trop}) - z(1)}\right]^2$$

Similarly, when the water vapor density at ground level is unknown and represented by w, the water vapor density profile is given by:

$$\log W(i) = \log w + [\log W(i_{trop}) - \log w]\left[\frac{z(i) - z(1)}{z(i_{trop}) - z(1)}\right]$$

where $i = 1, \ldots, i_{trop}$.

If the water vapor density if known at ground level, but its rate of change with respect to altitude is unknown and represented by w, the water vapo density profile is given by:

$$\log W(i) = \log W(1) + \log w(z(i) - z(1)) + [\log W(i_{trop}) - \log W(1) - \log w[z(i_{trop}) - z(1)]]\left[\frac{z(i) - z(1)}{z(i_{trop}) - z(1)}\right]^2$$

Once the Atmospheric Parameter Space has been defined, the next step in the present method is to establish expected radiance values at step 40 for the Atmospheric Parameter Space. To complete this step, the following are used:

$U_t(\lambda)$ = upwards thermal flux emitted by the atmosphere into the aperture of a sensing system utilized to produce the image of interest;

$U_s(\lambda)$ = upward solar radiant flux into the aperture of the sensing system;

$D_t(\lambda)$ = downward thermal radiant flux emitted by the atmosphere at the aperture of the sensing system producing the image of interest; and $D_s(\lambda)$ = downward solar radiant flux at the aperture of the sensing system producing the image of interest where $\lambda$ represents the passband wavelength in the sensing system Using these variables, the following five (5) quantities are then determined:

(1) the radiance emitted by the atmosphere, $(R_{ae})$, according to $$R_{ae} = \int U_t(\lambda) S(\lambda) d\lambda$$

where $S(\lambda)$ = sensing system spectral response at wavelength $\lambda$;

(2) the solar radiance emitted scattered by the atmosphere, $(R_{as})$, according to $$R_{as} = \int U_s(\lambda) S(\lambda) d\lambda;$$

(3) the radiance emitted downward by the atmosphere and reflected by a Lambertian surface into the aperture, $(R_{ltr})$, according to $$R_{ltr} = \int (1 - \bar{\epsilon}(\lambda)) D_t(\lambda) \tau(\lambda) S(\lambda) d\lambda$$

where $\bar{\epsilon}(\lambda)$ = surface emissivity at wavelength $\lambda$; and $\tau(\lambda)$ = the transmissivity of the atmosphere at wavelength $\lambda$;

(4) the radiance reflected by a Lambertian surface into the aperture, $(R_{ltrs})$, according to $$R_{ltrs} = \int (1 - \bar{\epsilon}(\lambda)) \sigma(\lambda) \tau(\lambda) S(\lambda) d\lambda$$

where $\sigma(\lambda)$ = the solar radiance at the surface at wavelength $\lambda$; and (5) the solar radiance scattered by the atmosphere and reflected by a Lambertian surface into the aperture, $(R_{strs})$, according to $$R_{strs} = \int (1 - \epsilon(\lambda)) D_s(\lambda) \tau(\lambda) S(\lambda) d\lambda.$$

When the expected radiance values have been estimated, an estimate of the surface temperature is determined in step 50. Using the foregoing quantities, the following equations are performed during this step:

Let N be the number of thermal infrared bands for a multispectral sensing system, or the number of images of the surface of interest acquired simultaneously with the single-band thermal infrared sensing system. If the surface temperature is h, then the expected radiance emitted by the surface into the aperture of the sensing system in the i'th band or image after transmission through the atmosphere, $R_{ge}(h)$, would be given by:

$$R_{ge}(h) = \int \epsilon(\lambda) P(h,\lambda) \tau(\lambda) S(\lambda) d\lambda$$

where $P(h,\lambda)$ = is the Plank radiance emitted at wavelength $\lambda$ by a body at temperature h.

The expected entrance aperture at surface temperature h, $(R_{eea}(h))$, is determined and would be given by $$R_{eea}(h) = R_{ge}(h) + R_{ae} + R_{as} + R_{ltr} + R_{ltrs} + R_{strs}$$

where $P_{ge}(h)$ = the radiance emitted into the aperture of the sensing system by the surface of the object of surface temperature h;

$R_{ae}$ = radiance emitted by the atmosphere;

$R_{as}$ = the solar radiance emitted scattered by the atmosphere;

$R_{ltr}$ = the radiance emitted downward by the atmosphere and reflected by a Lambertian surface into the aperture of the sensing system;

$R_{ltrs}$ = the radiance reflected by a Lambertian surface into the aperture of the sensing system; and $R_{strs}$ = the solar radiance scattered by the atmosphere and reflected by a Lambertian surface into the aperture of the sensing system.

Once the surface temperature has been estimated, the best fit is performed in step 60 by fitting the radiance values measured from the image to the expected radiance values determined for the Atmospheric Parameter Space domain. In step 70, a radiance error is derived from the fit. The radiance error is a measure of the quality of the fit performed in step 60. By letting the actual measured entrance aperture radiance of the i'th surface be denoted by $R_{mea}(i)$, determination of the radiance error, E, as given by the sum of the squared differences, where the index i is over the N images of the surface, is given by:

$$E = \Sigma [R_{eea}(h,i) - R_{mea}(i)]^2$$

where $R_{eea}(h,i)$ = the expected entrance aperture radiance of the sensing system at surface temperature h and where index i is over the N images of the surface; and $R_{mea}(i)$ = the measured entrance aperture radiance of the sensing system where index i is over the N images of the surface.

The temperature, h, which corresponds to the minimum value for the radiance error, E, is the best estimate of the surface temperature of the surface of interest. This minimization process is performed in step 80 in the typical way through the use of gradient descent in the variable h. In other words, in step 80, the quality of the fit (i.e., the radiance error) is used to adjust the estimates made in earlier steps. By repeating steps 20 through steps 70, the radiance error, E can be minimized.

Finally, in step 90, the best fit is used to determine the atmospheric conditions and surface temperature of the object of interest as follows: Since the image of interest is assumed to have been produced through atmospheric conditions represented by (t,w), the Radiance Error Function, $\Delta R$, is now defined as the correspondence $\Delta R(t,w) = E$, where E is the radiance error.

Figure 3:
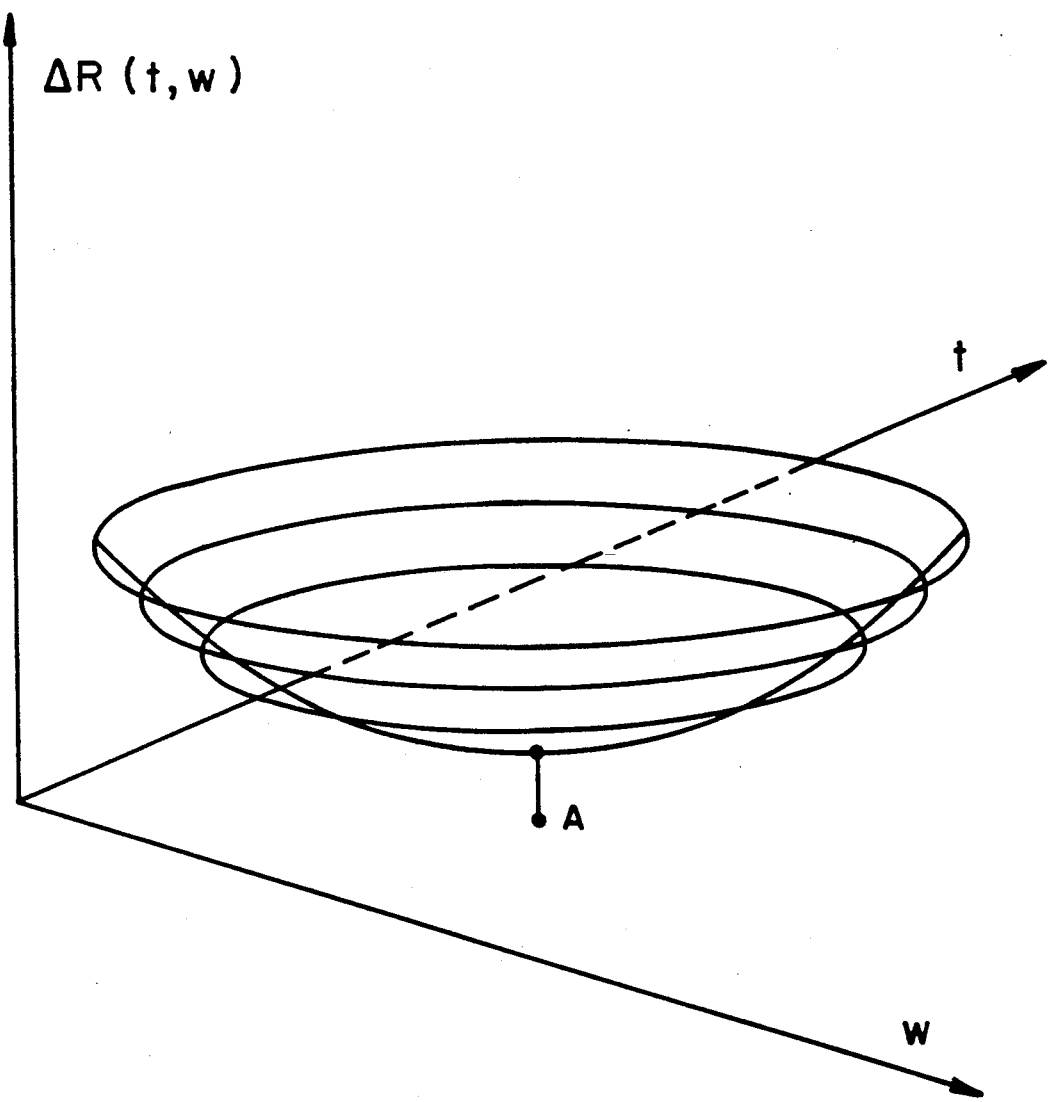
FIG. 3 is a graphical representation of the Radiance Error Function, illustrating the point at which the function is minimized, corresponding to the best estimate of the surface temperature of the surface or object of interest.

Referring to FIG. 3, there is shown a graphical representation of the Radiance Error Function $\Delta R$. In this Figure, a Radiance Error Function, $\Delta R$, is plotted with respect to atmospheric temperature, t, and water vapor density, w. Point A on the graph represents the point which minimizes the Radiance Error Function, and corresponds to the best estimate of the atmospheric temperature and water vapor density. The temperature, h, which corresponds to this point is the best estimate of the surface temperature of the object of interest.

Although preferred embodiments of the invention have been illustrated in the accompanying drawings and described in the foregoing Detailed Description, it will be understood that the invention is not limited to the embodiments disclosed, but is capable of numerous rearrangements and modifications of steps without departing from the spirit of the invention.

We claim:

1. A method of estimating atmospheric conditions of an object, comprising the steps of:
   (a) acquiring an atmospheric image of an object;
   (b) measuring radiance values from the atmospheric image;
   (c) determining a set of atmospheric condition parameters associated with the acquired image;
   (d) radiometrically correcting the atmospheric condition parameters;
   (e) determining expected radiance values for the set of atmospheric condition parameters;
   (f) determining the difference between the measured radiance values and the expected radiance values;
   (g) adjusting the set of atmospheric condition parameters based on the difference between the measured radiance values and the expected radiance values;
   (h) repeating steps (d) through (g) to minimize the difference between the measured radiance values and the expected radiance values; and
   (i) determining the atmospheric conditions of the body from the minimum value of the difference between the measured radiance values and the expected radiance values.

2. The method of claim 1 wherein the step of acquiring a image of the body includes generating a multispectral infrared image.

3. The method of claim 1 wherein the step of acquiring an image of the body includes generating a single-band thermal infrared image.

4. The method of claim 1 wherein the step of determining a set of atmospheric condition parameters includes generating an estimate of said atmospheric condition parameters.

5. The method of claim 1 wherein the step of radiometrically correcting the atmospheric condition parameters includes generating a radiometric model from low-resolution atmospheric transmission (Lowtran).

6. The method of claim 1 wherein the step of radiometrically correcting the atmospheric condition parameters includes generating a radiometric model from moderate-resolution atmospheric transmission (Modtran).

7. The method of claim 1 wherein the step of radiometrically correcting the atmospheric condition parameters includes generating a radiometric model from hiresolution atmospheric transmission (Hitran).

8. The method of claim 1 wherein the step of determining the atmospheric condition parameters includes generating a multi-dimensional representation of atmospheric conditions 9. The method of claim 1 wherein the step of determining expected radiance values for the restricted set of atmospheric condition parameters further includes the steps of:
   (i) determining the radiance emitted by the atmosphere, ($R_{ae}$), according to $$R_{ae} = \int U_t(\lambda) S(\lambda) d\lambda$$

where $U_t$ = upward thermal radiant flux emitted by the atmosphere;

$\lambda$ = wavelength passband of a sensing system; and

S(λ) = sensing system spectral response at wavelength λ;

(ii) determining the solar radiance emitted scattered by the atmosphere, ($R_{as}$), according to $$R_{as} = \int U_s(\lambda) S(\lambda) d\lambda$$

where
$U_s$ = upward solar radiant flux;
λ = wavelength passband of a sensing system; and
S(λ) = sensing system spectral response at wavelength λ;

(iii) determining the radiance emitted downward by the atmosphere and reflected by a Lambertian surface, ($R_{ltr}$), according to $$R_{ltr} = \int (1 - \bar{\varepsilon}(\lambda)) D_t(\lambda) \tau(\lambda) S(\lambda) d\lambda$$

where
λ = wavelength passband in a sensing system;
$\bar{\varepsilon}(\lambda)$ = surface emissivity at wavelength λ;
S(λ) = sensing system spectral response at wavelength λ;
$D_t(\lambda)$ = the downward thermal radiant flux emitted by the atmosphere; and
τ(λ) = the transmissivity of the atmosphere at wavelength λ;

(iv) determining the radiance reflected by a Lambertian surface, ($R_{ltrs}$), according to $$R_{ltrs} = \int (1 - \bar{\varepsilon}(\lambda)) \sigma(\lambda) \tau(\lambda) S(\lambda) d\lambda$$

where
λ = wavelength passband in a sensing system;
$\bar{\varepsilon}(\lambda)$ = surface emissivity at wavelength λ;
S(λ) = sensing system spectral response at wavelength λ;
σ(λ) = the solar radiance at the surface at wavelength λ; and
τ(λ) = the transmissivity of the atmosphere at wavelength λ;

(v) determining the solar radiance scattered by the atmosphere and reflected by a Lambertian surface, ($R_{strs}$), according to $$R_{strs} = \int (1 - \bar{\varepsilon}(\lambda)) D_s(\lambda) \tau(\lambda) S(\lambda) d\lambda$$

where
λ = wavelength passband of a sensing system;
$\bar{\varepsilon}(\lambda)$ = surface emissivity at wavelength λ;
S(λ) = sensing system spectral response at wavelength λ;
$D_s(\lambda)$ = downward solar radiant flux; and
τ(λ) = the transmissivity of the atmosphere at wavelength λ;

(vi) determining the radiance emitted by the object of surface temperature h, $R_{ge}(h)$, according to $$R_{ge}(h) = \int \varepsilon(\lambda) P(h,\lambda) \tau(\lambda) S(\lambda) d\lambda$$

where
λ = wavelength passband of a sensing system;
$\bar{\varepsilon}(\lambda)$ = surface emissivity at wavelength λ;
P(h,λ) = is the Plank radiance emitted at wavelength λ by a body at temperature h;
S(λ) = sensing system spectral response at wavelength λ; and
τ(λ) = the transmissivity of the atmosphere at wavelength λ; and (vii) determining an expected entrance aperture at surface temperature h, ($R_{eea}(h)$), according to $$R_{eea}(h) = R_{ge}(h) + R_{ae} + R_{as} + R_{ltr} + R_{ltrs} + R_{strs}$$

where
$R_{ge}(h)$ = the radiance emitted into the aperture of the sensing system by the object of surface temperature h;
$R_{ae}$ = radiance emitted by the atmosphere;
$R_{as}$ = the solar radiance emitted scattered by the atmosphere;
$R_{ltr}$ = the radiance emitted downward by the atmosphere and reflected by a Lambertian surface into the aperture of the sensing system;
$R_{ltrs}$ = the radiance reflected by a Lambertian surface into the aperture of the sensing system; and
$R_{strs}$ = the solar radiance scattered by the atmosphere and reflected by a Lambertian surface into the aperture of the sensing system.

10. The method of claim 1 wherein the step of determining the difference between the measured radiance values and the expected radiance values includes determining a radiance error, E, between the measured radiance values and the expected radiance values, given by the sum-of-the-squared-differences, according to $$E = \Sigma [R_{eea}(h,i) - R_{mea}(i)]^2$$

where
$R_{eea}(h,i)$ = the expected entrance aperture at surface temperature h and where index i is over the N images of the surface; and
$R_{mea}(i)$ = the measured entrance aperture where index i is over the N images of the surface.

11. The method of claim 1 wherein the step of determining the atmospheric conditions of the surface of body includes determining the surface temperature, h, corresponding to the best fit of the measured radiance values and the expected radiance values.

12. A method of estimating atmospheric conditions of an object, comprising the steps of:
(a) acquiring an atmospheric image of the surface of the object;
(b) measuring radiance values from the acquired atmospheric image;
(c) determining a set of atmospheric condition parameters associated with the acquired image;
(d) generating a radiometric model to correct the atmospheric condition parameters;
(e) determining expected radiance values for the set of atmospheric condition parameters, including the steps of:
(1) determining the radiance emitted by the atmosphere, ($R_{ae}$), according to $$R_{ae} = \int U_t(\lambda) S(\lambda) d\lambda$$

where
$U_t$ = upward thermal radiant flux emitted by the atmosphere;
λ = wavelength passband of a sensing system; and
S(λ) = sensing system spectral response at wavelength λ;
(2) determining the solar radiance emitted scattered by the atmosphere, ($R_{as}$), according to $$R_{as} = \int U_s(\lambda) \, S(\lambda) \, d\lambda$$

where $U_s$ = upward solar radiant flux;
$\lambda$ = wavelength passband of a sensing system; and
$S(\lambda)$ = sensing system spectral response at wavelength $\lambda$;

(3) determining the radiance emitted downward by the atmosphere and reflected by a Lambertian surface, ($R_{ltr}$), according to $$R_{ltr} = \int (1 - \bar{\epsilon}(\lambda)) \, D_t(\lambda) \, \tau(\lambda) \, S(\lambda) \, d\lambda$$

where $\lambda$ = wavelength passband of a sensing system;
$\bar{\epsilon}(\lambda)$ = surface emissivity at wavelength $\lambda$;
$S(\lambda)$ = sensing system spectral response at wavelength $\lambda$;
$D_t(\lambda)$ = the downward thermal radiant flux emitted by the atmosphere; and
$\tau(\lambda)$ = ?;

(4) determining the radiance reflected by a Lambertian surface, ($R_{ltrs}$), according to $$R_{ltrs} = \int (1 - \bar{\epsilon}(\lambda)) \, \sigma(\lambda) \, \tau(\lambda) \, S(\lambda) \, d\lambda$$

where $\lambda$ = wavelength passband of a sensing system;
$\bar{\epsilon}(\lambda)$ = surface emissivity at wavelength $\lambda$;
$S(\lambda)$ = sensing system spectral response at wavelength $\lambda$;
$\sigma(\lambda)$ = the solar radiance at the surface at wavelength $\lambda$; and
$\tau(\lambda)$ = ?;

(5) determining the solar radiance scattered by the atmosphere and reflected by a Lambertian surface, ($R_{strs}$), according to $$R_{strs} = \int (1 - \epsilon(\lambda)) \, D_s(\lambda) \, \tau(\lambda) \, S(\lambda) \, d\lambda$$

where $\lambda$ = wavelength passband of a sensing system;
$\bar{\epsilon}(\lambda)$ = surface emissivity at wavelength $\lambda$;
$S(\lambda)$ = sensing system spectral response at wavelength $\lambda$;
$D_s(\lambda)$ = downward solar radiant flux; and
$\tau(\lambda)$ = transmissivity of the atmosphere at wavelength $\lambda$;

(6) determining the radiance emitted by the surface of the object of surface temperature h, $R_{ge}(h)$, according to $$R_{ge}(h) = \int \epsilon(\lambda) \, P(h,\lambda) \, \tau(\lambda) \, S(\lambda) \, d\lambda$$

where $\lambda$ = wavelength passband of a sensing system;
$\bar{\epsilon}(\lambda)$ = surface emissivity at wavelength $\lambda$;
$P(h,\lambda)$ = is the Plank radiance emitted at wavelength $\lambda$ by a body at temperature h;
$S(\lambda)$ = sensing system spectral response at wavelength $\lambda$; and
$\tau(\lambda)$ = transmissivity of the atmosphere at wavelength $\lambda$; and (7) determining an expected entrance aperture radiance at surface temperature h, ($R_{eea}(h)$), according to $$R_{eea}(h) = R_{ge}(h) + R_{ae} + R_{as} + R_{ltr} + R_{ltrs} + R_{strs}$$

where $R_{ge}(h)$ = the radiance emitted into the aperture of the sensing system by the surface of the object of surface temperature h;
$R_{ae}$ = radiance emitted by the atmosphere;
$R_{as}$ = the solar radiance emitted scattered by the atmosphere;
$R_{ltr}$ = the radiance emitted downward by the atmosphere and reflected by a Lambertian surface into the aperture of the sensing system;
$R_{ltrs}$ = the radiance reflected by a Lambertian surface into the aperture of the sensing system; and
$R_{strs}$ = the solar radiance scattered by the atmosphere and reflected by a Lambertian surface into the aperture of the sensing system;

(f) determining the difference between the measured radiance values and the expected radiance values, including the step of determining a radiance error value, E, for the surface of the object by a best fit calculation of the difference between the measured radiance values from the image and the expected radiance values given by the sum-of-the-squared-differences, according to $$E = \Sigma [R_{eea}(h,i) - R_{mea}(i)]^2$$

where $R_{eea}(h,i)$ = the expected entrance aperture of the sensing system at surface temperature h and where index i is over the
N images of the surface; and
$R_{mea}(i)$ = the measured entrance aperture of the sensing system where index i is over the N images of the surface;

(g) adjusting the set of atmospheric condition parameters based on the radiance error, E;
(h) repeating steps (d) through (g) to minimize the radiance error E; and
(i) determining the atmospheric conditions of the body by determining condition, h, corresponding to the minimum value of the radiance error, E.

13. The method of claim 12 wherein the step of determining a set of potential atmospheric condition parameters includes generating an estimate of said atmospheric condition parameters.

14. The method of claim 12 wherein the step of acquiring an atmospheric image of the body includes generating a multi-spectral infrared image.

15. The method of claim 12 wherein the step of acquiring an atmospheric image of the body includes generating a single-band thermal infrared image.

16. The method of claim 12 wherein the step of generating a radiometric model to correct the atmospheric condition parameters includes generating a radiometric model from low-resolution atmospheric transmission (Lowtran).

17. The method of claim 12 wherein the step of generating a radiometric model to correct the atmospheric condition parameters includes generating a radiometric model from moderate-resolution atmospheric transmission (Modtran).

18. The method of claim 12 wherein the step of generating a radiometric model to correct the atmospheric condition parameters includes generating a radiometric model from hi-resolution atmospheric transmission (Hitran).

* * * * *